UNITED STATES PATENT OFFICE.

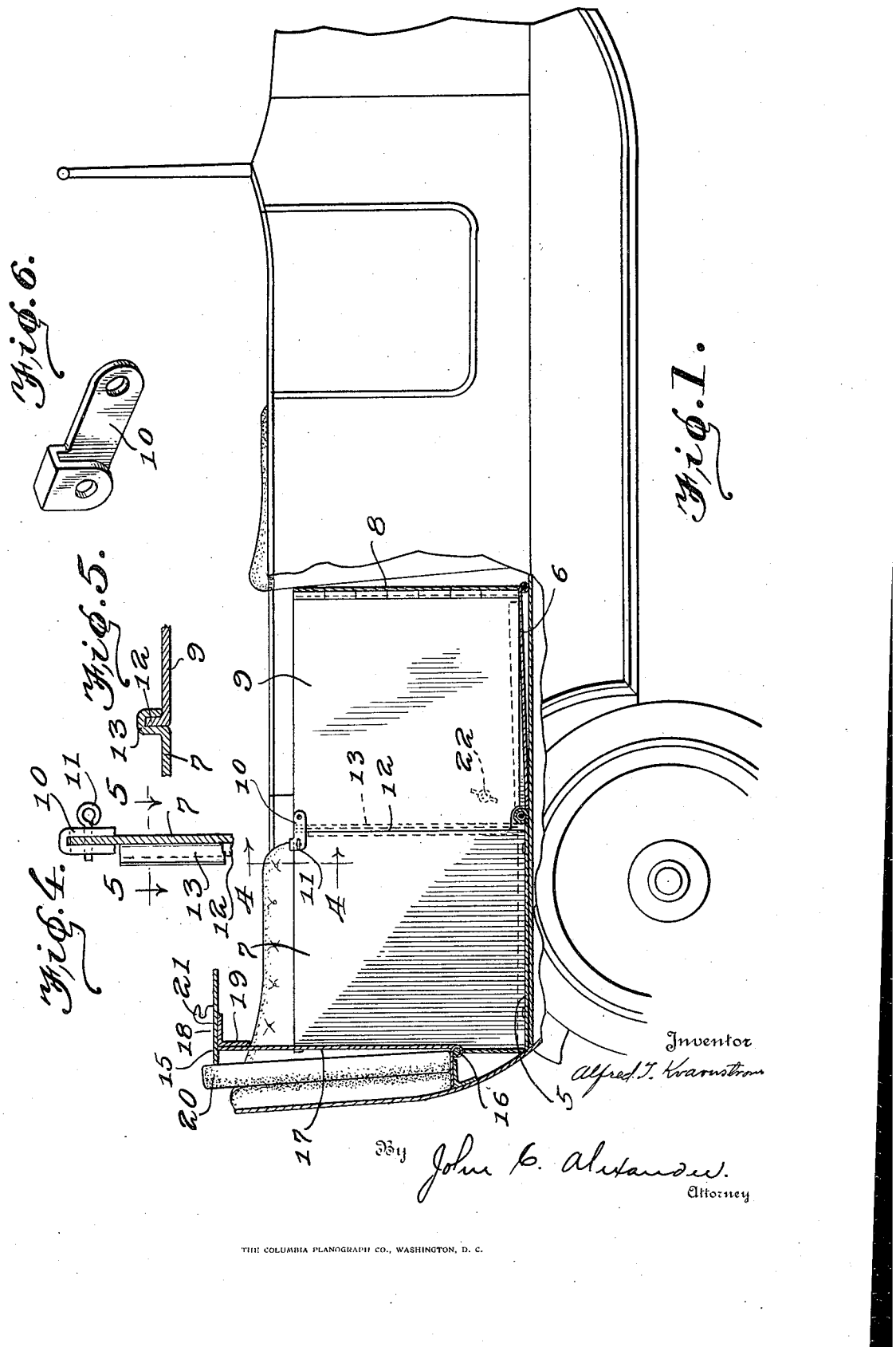

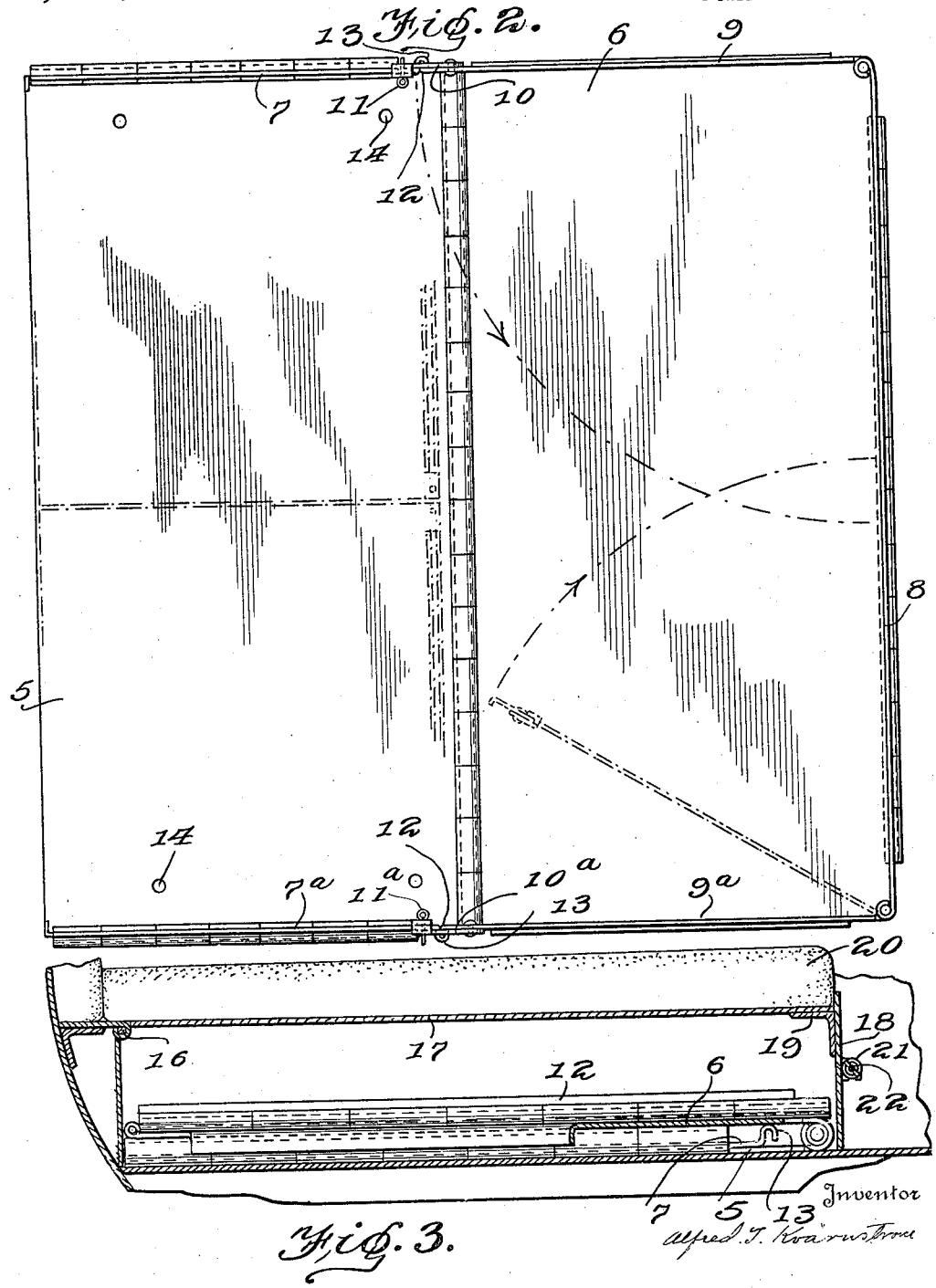

ALFRED T. KVARNSTROM, OF DETROIT, MICHIGAN.

COLLAPSIBLE-BODY INSERT FOR AUTOMOBILES.

1,309,760.  Specification of Letters Patent.  Patented July 15, 1919.

Application filed March 1, 1918. Serial No. 219,804.

*To all whom it may concern:*

Be it known that I, ALFRED T. KVARNSTROM, a citizen of the United States, residing at Detroit, in the county of Wayne and State of Michigan, have invented certain new and useful Improvements in Collapsible-Body Inserts for Automobiles, of which the following is a specification.

My invention relates to collapsible body inserts for automobiles, and more particularly to foldable all-metal bodies adapted for quickly converting a touring car into a delivery vehicle with the tonneau especially adapted for carrying parcels, bulk commodities, etc. without damaging the cushions or the inner walls and floor of the automobile.

The primary object of my invention consists in providing a collapsible inner body or lining for the tonneau of a touring car, which when opened will fully cover and protect the cushions and interior of the tonneau from damage through contact with the commodities to be carried, and which when folded will occupy but slight space, enabling it to be readily kept under the rear seat or in any other desirable place.

Another object is to provide an all-metal insert or lining that is simple and inexpensive, is composed of parts not liable to become deranged, and furthermore is so constructed that none of its parts is subjected to excessive strain or wear.

With the above and other objects in view which will readily appear as the invention is better understood, my invention consists in the novel construction, combination and arrangements of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:

Figure 1 is a side view of the rear portion of an automobile with parts broken away and shown in section, with my collapsible lining in opened position;

Fig. 2 is a plan view of my improved lining in opened position, with certain of the positions occupied by the side walls when closed shown in dotted lines;

Fig. 3 is a detail sectional view showing the position occupied by the collapsible lining when folded and placed under the rear seat of an automobile;

Fig. 4 is a detail sectional view taken substantially on the line 4—4 of Fig. 1.

Fig. 5 is a detail section on the line 5—5 of Fig. 4; and

Fig. 6 is a detail perspective view of the latch used to secure the side walls.

In the drawings, I have illustrated only so much of the body portion of an automobile as is necessary to portray the operation and coaction of my improved collapsible lining for the tonneau thereof, it being understood that the dimensions of my improved lining may be varied at will to fit the tonneau of different makes and sizes of cars. As herein shown for purposes of exemplification, I have chosen a car adapted to receive a lining having a floor space of approximately 36 ins. square with the side and front walls of substantially 18 ins. in height, this size being convenient for folding and ready assembling when desired for use.

The collapsible lining or insert comprises a floor portion in two sections 5 and 6 connected by a central hinge arranged transversely of the car when the lining is in position for receiving commodities, side walls 7 and 7$^a$ connected to the floor piece 5 by horizontal hinges at the sides thereof, a front wall 8 connected by a horizontal hinge to the outside edge of the floor piece 6, and side walls 9 and 9$^a$ connected to the front wall 8 by vertical hinges at the sides thereof. Upturned side flanges on the floor piece 6 provide stops for positioning the side walls 9 and 9$^a$, and the several side walls are locked in opened position by means of latches 10 and 10$^a$ upon the side walls 9 and 9$^a$ fitting over the upper edges of the side walls 7 and 7$^a$ respectively. Locking pins 11 and 11$^a$ fitting through suitable apertures in the latch and side walls may be employed to prevent accidental dislocation of the latches. To strengthen the sides and to maintain a smooth inner wall for the lining I preferably provide an outwardly-turned flange 12 on the side walls 9 and 9$^a$ fitting into corresponding grooves 13 on the side walls 7 and 7$^a$ respectively (see Fig. 5). The lining is firmly secured in place within the tonneau by means of screws, bolts, or similar fastening means, passing through apertures 14 in the floor piece 5. The rear wall of the collapsible lining is formed by the underside of the upturned rear seat 15 of the automobile (see Fig. 1) and through suitable projections or lugs on the side walls 7 the rear seat is maintained in its upright position as long as the lining is in place. As herein shown, the rear seat is hinged, as at 16, to the body portion of the automobile, and comprises a seat 17 and a front piece 18 secured to the seat by an angle iron 19 in position to normally maintain the seat level and to provide a stop for the cushion 20 (see Fig. 3). To hold the seat normally in level position a notched latch 21 is adapted to fit over the bolt portion of a locking bolt, a thumb nut 22 thereon being turned into engagement with the latch 21 to frictionally hold the same.

As shown in Fig. 3, the collapsible lining may be compactly folded into a small space and when so folded can be kept under the rear seat. To obtain this folded position from the open position shown in Figs. 1 and 2, the latches are first detached from the side walls 7 and 7ᵃ and the side walls 9 and 9ᵃ folded on their vertical hinges into close alinement with the front wall 8, whereupon the front wall and side walls 9 and 9ᵃ are together folded outwardly until the front wall contacts with the underside of the floor piece 6. The side walls 7 and 7ᵃ are then folded inwardly into engagement with the floor piece 5, whereupon the floor pieces 5 and 6 are folded together on their central hinge to bring the underside of the floor piece 6 into engagement with the folded side walls 7 and 7ᵃ. Such folded position is clearly shown in Fig. 3 and the dotted lines shown in Fig. 2 indicate intermediate portions assumed by the parts.

It will be apparent that the several floor and wall sections together with their interfitting hinged parts and the flanges and apertures therein can all be made from sheet metal by punch press or similar methods.

While it will be apparent that the illustrated embodiment herein illustrated is well calculated to adequately fulfil the objects primarily stated, it is to be understood that the invention is susceptible to variation, modification and change without departing from the spirit and scope of the invention as set forth in the subjoined claims.

Having described my invention, I claim:

1. A collapsible lining for the tonneau of automobiles comprising a floor portion in two connected sections, a pair of side wall sections hinged to one of the floor sections, a front wall hinged to the other of said floor sections, and a second pair of side wall sections hinged to the front wall and coöperating with the first-mentioned side wall sections.

2. A collapsible lining for the tonneau of automobiles comprising a floor portion in two connected sections, a pair of side wall sections hinged to one of the floor sections, a front wall hinged to the other of said floor sections, a second pair of side wall sections hinged to the front wall and coöperating with the first-mentioned side wall sections, and interfitting tongue and groove portions carried by the side walls.

3. A collapsible lining for the tonneau of automobiles comprising a floor portion in two connected sections, a pair of side wall sections hinged to one of the floor sections, a front wall hinged to the other of said floor sections, a second pair of side wall sections hinged to the front wall and cooperating with the first-mentioned side wall sections, interfitting tongue and groove portions carried by the side walls, and locking means carried by one pair of side walls and adapted to engage over the other side walls.

4. A collapsible lining for the tonneau of automobiles comprising a floor portion of two sections connected together by a horizontal hinge, a pair of side wall sections horizontally hinged to one of the floor sections, a front wall hinged to the other floor section, and a second pair of side walls vertically hinged to the front wall and coacting with the first-mentioned side walls to complete the sides of the lining.

5. The combination with the rear seat of an automobile, of a collapsible insert adapted to form a lining for the tonneau of the automobile and comprising a series of sheet metal sections hingedly connected to form a floor portion and two connected sections, a pair of side wall sections hinged to one of the floor sections, a front wall hinged to the other of said floor sections, and a second pair of said wall sections hinged to the front wall and coöperating with the first-mentioned side wall sections, all arranged in juxtaposition to said rear seat, whereby the underside of the rear seat will form the rear wall of the insert.

6. A collapsible lining for the tonneau of automobiles comprising a floor portion and two connected sections, a pair of side wall sections hinged to one of the floor sections, a front wall hinged to the other of said floor sections, a second pair of side wall sections hinged to the front wall and coöperating with the first-mentioned side wall sections, a pair of latches pivoted respectively to one pair of side wall sections and adapted to fit over the edges of the other pair of side wall sections to maintain the lining in open position.

ALFRED T. KVARNSTROM.

Witnesses:
EUGENE G. DONOHOE,
EDWARD J. MCCARTHY.